United States Patent [19]

Brown, Jr. et al.

[11] Patent Number: 4,504,082
[45] Date of Patent: Mar. 12, 1985

[54] APPARATUS FOR OPERATING A PLURALITY OF CONTROL CIRCUITS HAVING A COMMON CONDUCTOR AND A CIRCUIT THEREFOR

[76] Inventors: Milton F. Brown, Jr., 2035 Echo Cover, Virginia Beach, Va. 23454; Darl Anderson, 4425 Jeanne St., Virginia Beach, Va. 23462

[21] Appl. No.: 499,464

[22] Filed: May 31, 1983

[51] Int. Cl.³ ............................................. B60R 21/00
[52] U.S. Cl. ................................ 280/735; 307/10 R; 307/121
[58] Field of Search ....................... 280/731, 735, 736; 180/282; 307/9, 10 R, 121; 340/52 H, 825.62

[56] References Cited

U.S. PATENT DOCUMENTS

| | | | |
|---|---|---|---|
| 3,846,639 | 11/1974 | Veda et al. | 307/9 |
| 3,876,272 | 4/1975 | Tsutsumi et al. | 280/731 |
| 4,223,911 | 9/1980 | Cymbal et al. | 280/731 |
| 4,386,279 | 5/1983 | Yoshimi et al. | 307/10 R |
| 4,438,425 | 3/1984 | Tsuchida et al. | 340/825.62 |

Primary Examiner—Joseph F. Peter, Jr.
Assistant Examiner—Ross Weaver
Attorney, Agent, or Firm—Shlesinger, Arkwright, Garvey & Fado

[57] ABSTRACT

A multi-purpose common conductor electrical system for use with a vehicle steering assembly or the like, comprising a steering assembly having a rotatable steering wheel and being adapted for directing a vehicle; first and second control circuits connected to said steering wheel and rotatable therewith; a common conductor connected to said first and said second control circuits and extending at least a portion of said steering assembly length; a common power supply connected to said common conductor for providing power to said first and said second control circuits; blocking means for preventing the unintended conducting of power to said first control circuit when power is conducted to said second control circuit; and, limiting means for intentionally conducting power to said first control circuit when power is conducted to said second control circuit for permitting simultaneous operation of said first and said second control circuits is disclosed.

28 Claims, 3 Drawing Figures

APPARATUS FOR OPERATING A PLURALITY OF CONTROL CIRCUITS HAVING A COMMON CONDUCTOR AND A CIRCUIT THEREFOR

BACKGROUND OF THE INVENTION

Government regulations, as well as consumer demands, have greatly increased the number of control systems located in the area of a vehicle steering wheel. Many of these control systems require electrical wiring for their operation. Heretofore, each of these electrical control systems required its own wiring. The number of these circuits, including their individual leads, has resulted in complex coupling systems in order to connect those parts of the system which are rotatable with the steering wheel to the fixed position storage battery or power supply.

Pruneski, U.S. Pat. No. 3,525,536, discloses a multi-track slip ring for coupling a plurality of vehicle control circuits connected to the steering wheel to the power supply. Each of the circuits of Pruneski requires its own leads with the result that as the number of circuits increases, the complexity of the coupling system likewise increases. The cost of manufacturing an electrical coupling system such as Pruneski increases as the number of control circuits increases.

In view of the above problem, a new and unique apparatus for operating a plurality of vehicle control circuits connected to a common conductor is desireable both for its size and simplicity and for its lower cost of manufacturing.

OBJECTS AND SUMMARY OF THE INVENTION

It is a primary object of the disclosed invention to provide an apparatus for operating a plurality of vehicle control circuits connected through a common conductor to a power supply.

It is an additional object of the disclosed invention to provide a single track electrical coupling for connecting a plurality of vehicle control circuits mounted on a rotatable steering wheel to a fixed position power supply.

A further object of the disclosed invention is to provide an apparatus which permits a vehicle expandable air bag and a vehicle horn to be operated simultaneously and through a common conductor and which prevents the vehicle horn from interfering with the operation of the air bag system.

Yet a further object of the disclosed invention is to provide a circuit which is adapted for operating a plurality of control circuits connected through a common conductor to a power supply.

Still another object of the disclosed invention is to provide a circuit having a plurality of control circuits connected through a common conductor and in which grounding of one of the control circuits does not ground at least one other of the additional control circuits.

Yet still a further object of the disclosed invention is to provide an apparatus and a circuit therefor for simplying and decreasing the cost of a vehicle steering assembly electrical coupler.

These and other objects and advantages of the invention will be readily apparent in view of the following description and the drawings of the above described invention.

DESCRIPTION OF THE DRAWINGS

The above and other objects and advantages and novel features of the present invention will become apparent in the following detailed description of the preferred embodiment of the invention illustrated in the accompanying drawings, wherein.

DESCRIPTION OF THE INVENTION

Figure 3:
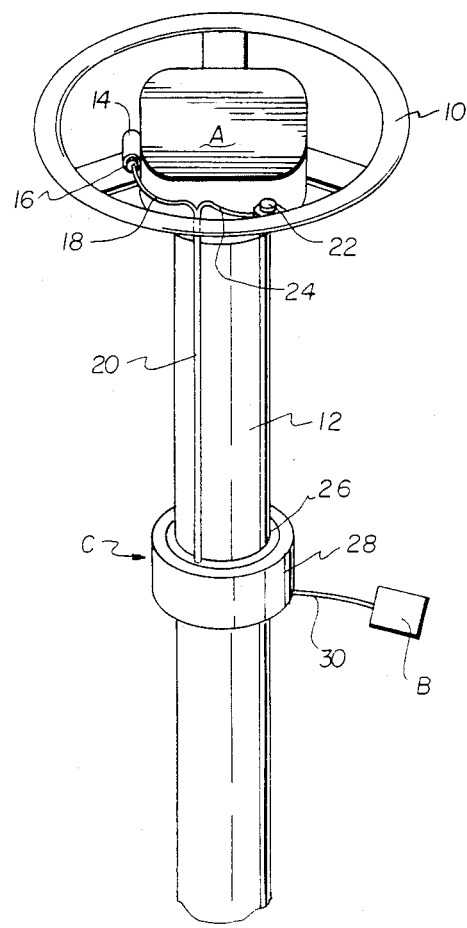

As best shown in FIG. 3, a vehicle air bag A is advantageously mounted to a steering wheel 10 which is mounted to a rotatable steering shaft 12. The steering wheel 10 and steering shaft 12 are advantageously adapted for directing a vehicle, by means well known in the art.

Air bag A has a gas source 14 connected thereto and adapted for inflating the air bag A from a first compressed position to a second expanded operable position (not shown). An electrically fired squib 16 is mounted between gas source 14 and air bag A and is adapted for preventing gas communication from source 14 to air bag A in the unfired position and in permitting gas communication from source 14 to air bag A when in the fired position. Squib 16 has lead 18 extending therefrom and connected to common conductor 20.

A vehicle horn switch 22 is mounted to steering wheel 10 and has lead 24 connected to common conductor 20. While a horn switch 22 and an electrically fired squib 16 are disclosed, it will be readily apparent that additional vehicle control devices may be advantageously mounted to steering wheel 10 and be adapted for operating in accordance with the principles of the invention.

A single track axial type electrical slip ring or connecting means C is mounted to shaft 12 and includes a first inner portion 26 secured to shaft 12 and rotatable therewith. A slip ring fixed around the shaft 12 and having a face transverse of the shaft 12 on which a spring loaded contact finger slides is also in common use. Coupling C also includes outer portion 28 which is in electrical connection with inner portion 26 and which is, preferably, fixed in position. Inner portion 26 is free to rotate relative to outer portion 28 while still maintaining electrical connection by means well known in the art. Lead 30 is connected to outer portion 28 and to power supply B. Power supply B is, preferably, a vehicle storage battery, and is capable of operating both horn switch 22 and squib 16 either simultaneously or individually.

DESCRIPTION OF FIG. 1

Figure 1:
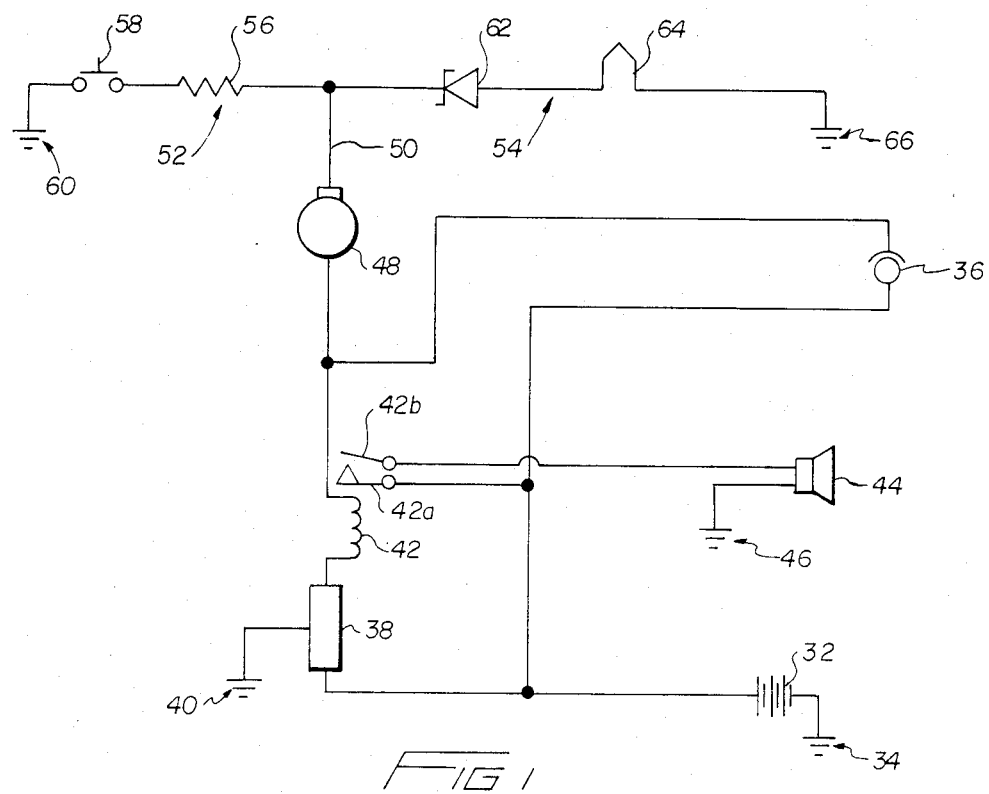
FIG. 1 is a schematic diagram of a circuit for accomplishing the purposes of the invention.

Referring to FIG. 1, a storage battery 32 has one terminal connected to ground as at 34 and the other terminal connected to a vehicle collision sensor 36 and to a voltage regulator 38. Storage battery 32, preferably, is a 12 volt automobile battery, although higher or lower voltages may be used depending upon the application. Voltage regulator 38 has one terminal connected to ground as at 40, and another terminal connected to relay coil 42. Voltage regulator 38, preferably, has a voltage output of 5 volts for reasons to be explained later. Although voltage regulator 38 is disclosed as having an output of 5 volts, it should be obvious that higher or lower voltages may be used.

Relay coil 42 has one terminal of the coil connected to voltage regulator 38. Contact 42b is connected to horn 44 and is adapted for providing current from storage battery 32 when the contacts 42a and 42b of relay 42 are in the closed position. Horn 44 is grounded as at 46. Relay coil 42 is connected through single track axial type electrical slip ring or coupling 48, which is identical to electrical coupling C disclosed above, and through coupling 48 to a length of common conductor 50. Common conductor 50 has a T junction to which control circuits 52 and 54 are connected. While two control circuits 52 and 54 are disclosed as being connected to conductor 50, it should be obvious that any number of control circuits may be connected to the common conductor 50 if the principles of the invention are followed.

Control circuit 52 includes current limiting resistor 56 and horn switch 58 and is connected to ground at 60. In this way, if horn switch 58 is depressed so to close or complete circuit 52 then contacts 42a and 42b close and current flows from battery 32 to horn 44 to sound horn 44. When switch 58 is in the open position then the circuit 52 is open and not completed and the contacts will not close and therefore the horn will not sound.

Control circuit 54, preferably, includes current blocking zener diode 62 capable of blocking a forward voltage of 6.8 volts. Bridge wire fired ignitor or squib 64, which is identical to squib 16, is connected to zener diode 62 and to ground at 66. Collision sensor 36 is connected to coupling 48 and to common conductor 50 and control circuit 54 and is advantageously adapted for sensing a collision and for signaling squib 64 in order to inflate an air bag, such as air bag A.

OPERATION OF EMBODIMENT OF FIG. 1

Should the vehicle operator (not shown) wish to sound horn 44, then closing control circuit 52 by depressing switch 58 completes the circuit and causes horn 44 to sound. Should sensor 36 detect a collision then a signal is sent through common conductor 50 to control circuit 54. Sensor 36 is connected to battery 32 and, consequently, has a voltage supply equal to that of storage battery 32, and, being preferably 12 volts. Zener diode 62 is capable, preferably, of blocking 6.8 volts and therefore the 12 volts supplied by battery 32 exceeds the forward blocking voltage breakdown level and causes current to flow through diode 62 to fire squib 64. Squib 64, preferably, is rated at 0.5 amps at 6 volts and has an all fire rating of 2 amps. Consequently, upon ignition of squib 64 a gas supply, such as gas supply 14, may feed the contained gas to an air bag, such as air bag A, so to expand the air bag and prevent injury to the operator.

It should be obvious from the description herein provided that should the vehicle operator complete control circuit 52 then squib 64 will not be ignited as zener diode 62 is capable of blocking 6.8 volts and voltage regulator 38 only provides 5 volts. Consequently, expansion of air bag A because of sounding of the horn 44 will not result.

The invention permits the vehicle operator to sound horn 44 through control circuit 52 during a collision while simultaneously permitting sensor 36 to cause squib 64 to fire so as to expand air bag A. Current limiting resistor 56 is, preferably, a 27 Ohm resistor and is advantageously connected in control circuit 52 and prevents the complete grounding of control circuit 52, and therefore, control circuit 54 receives sufficient current to exceed the breakdown voltage of zener diode 62 when sensor 36 is activated. Current limiting resistor 56 has sufficient resistivity so that should control circuit 52 be completed by the closing of switch 58 and should sensor 36 be activated, then current limiting resistor 56 diverts excess current to control circuit 54 which exceeds the breakdown voltage of 6.8 volts of zener diode 62 and permits squib 64 to ignite. Consequently, even though the vehicle operator may be sounding the vehicle horn 44 during a collision, the impact sensor 36 will still cause squib 64 to fire so as to expand air bag A.

While a current limiting resistor 56 of 27 Ohms is disclosed, it should be obvious that there are many other advantageous replacements and among them are the use of a tunnel resistor and a diode. Similarly, while a current blocking means or zener diode 62 with 6.8 volts forward blocking is disclosed, it should be obvious that the use of a bipolar or field effect transistor having a negative base or gate, a plain diode, or a suitably sized resistor may be substituted. Similarly, it should be obvious that with suitable power supplies and appropriate current blocking diode selection that any number of vehicle control or display circuits may be connected to a common conductor.

DESCRIPTION OF FIG. 2

Figure 2:
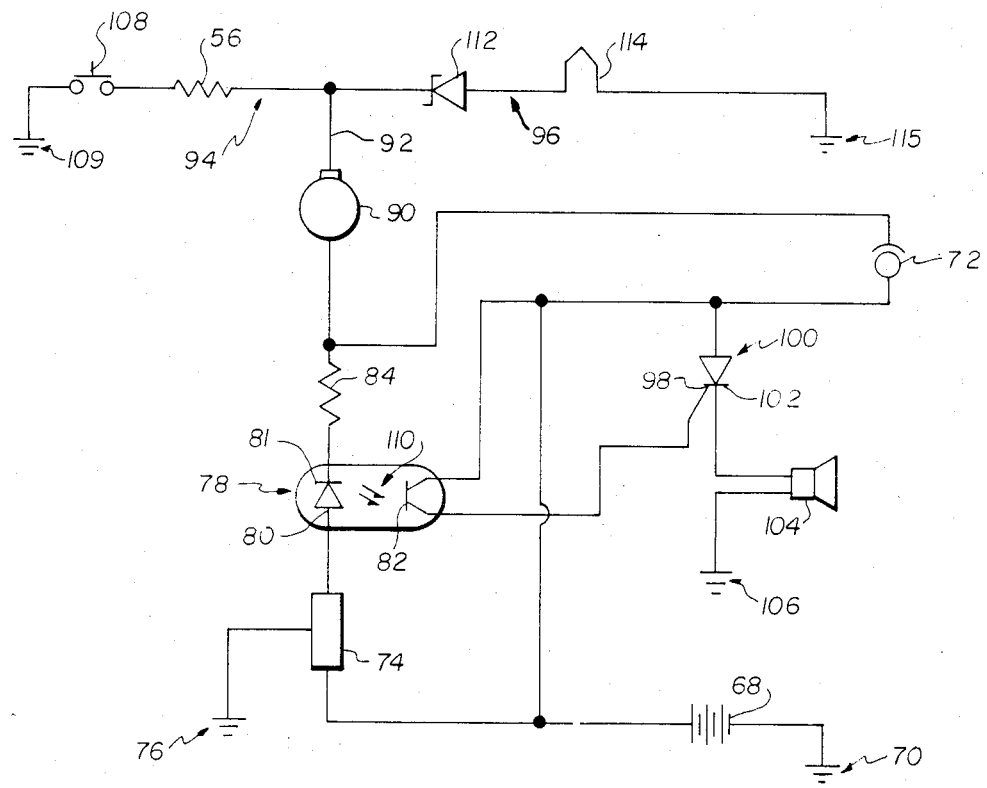
FIG. 2 is a schematic diagram of a modified embodiment of the circuit of FIG. 1; and, FIG. 3 is a perspective view of an apparatus embodying the principles of the invention.

The circuit disclosed in FIG. 2 is substantially similar to that disclosed in FIG. 1. Referring to FIG. 2, the circuit includes a battery 68 which has one terminal grounded at 70 and the other terminal is connected to a sensor 72 and to a voltage regulator 74. Voltage regulator 74 is grounded at 76.

Voltage regulator 74 is connected to opto-coupler 78. The voltage regulator 74 reduces the voltage from storage battery 68 and applies this reduced voltage to the anode 80 of a light emitting diode (LED) in the opto-coupler 78. The cathode 81 of opto-coupler 78 is connected to a current limiting resistor 84. An opto-coupler, such as opto-coupler 78, includes a light source or input 80 and a light detector or output 82 in which both the source 80 and the detector 82 are housed in a single package which is sealed against outside light. An electrical signal applied to light source 80 changes the amount of light emitted. The emitted light falls upon, and is collected by, the detector 82. These input electrical signals are thus coupled to the output.

Current limiting resistor 84 is connected to an electrical slip ring or connector 90 which is identical to coupling C of FIG. 3 and to the single track axial type electrical slip ring 48 of FIG. 1. Coupler or single track slip ring 90 is connected to common conductor 92 which is connected at a T junction to control circuits 94 and 96. Control circuits 94 and 96 are similar to control circuits 52 and 54 of FIG. 1. Sensor 72 is identical to sensor 36 of FIG. 1.

Light detector 82 is connected to the gate 98 of a silicon controlled rectifier (SCR) 100. The cathode 102 of SCR 100 is connected to one terminal of horn 104 whose other terminal is grounded at 106. The anode of SCR 100 is also connected to battery 68. As long as there is an absence of positive voltage on the gate of the SCR 100, the SCR 100 will remain cut-off and prevent the flow of current, and thus preventing the horn from sounding.

OPERATION OF FIG. 2 EMBODIMENT

When horn switch 108 of control circuit 94 is closed and the circuit grounded at 109, then current flows through the LED 80 which causes the LED 80 to radiate. The impingement of radiant light, as shown by the arrows 110 in opto-coupler 78, on light detector 82 impresses a voltage on the gate 98 of SCR 100 which causes the SCR 100 to conduct. When SCR 100 conducts current it will cause the horn to sound. An advantage of the present circuit is that when an SCR, such as SCR 100, goes into conduction it continues to conduct even though the gate potential, such as that caused by detector 82, is removed. An electro-mechanical horn, such as horn 104, by the nature of its design interrupts the circuit at a frequency equal to the frequency of its sound. Therefore, the commutation effect of the horn is used to turn off SCR 100.

The output of voltage regulator 74 is less than the breakdown voltage of zener-diode 112 of control circuit 96 so as to prevent squib 114, which is identical to squib 64 of FIG. 1, from igniting under normal operating conditions and going to ground at 115. Current limiting resistor 116 prevents the horn switch 108 from conducting all of the current to ground 109 and permits detonation of squib 114 when a crash has been detected by sensor 72. Squib 114 is, preferably, part of the inflation means of a vehicle air bag, such as air bag A.

Should a crash be detected by sensor 72, then current will flow from battery 68 through slip ring or coupler 90 and will have a voltage exceeding the breakdown voltage of zener-diode 112 so as to cause squib 114 to ignite and to expand an air bag, such as air bag A. Similarly, should the horn switch 108 be pressed so as to close control circuit 94 then current will flow from voltage regulator 74 to light source 80 which will radiate light to detector 82 which will impress a voltage on SCR 100 and will cause horn 104 to sound. Should the horn 104 be sounded while a crash is detected by a sensor 72, then current limiting resistor 116 prevents all of the current from being grounded by switch 108 and sufficient voltage and current is available which exceeds the breakdown voltage of zener-diode 112 so as to ignite squib 114. Consequently, a vehicle operator may sound the horn 104 at any time without igniting squib 114 but, should horn 104 be sounded during a collision, a means has been provided to insure that squib 114 will ignite so as to inflate an air bag, such as air bag A.

It should be obvious that control circuit 94 may replace current limiting resistor 116 with a tunnel resistor or a diode in various embodiments. Additionally, zener-diode 112 may be replaced by a plain diode, a tunnel diode, or a resistor in various embodiments. SCR 100 may be replaced with a bipolar transistor or an enhancement mode unipolar transistor in the field effects family. Additionally, opto-coupler 78 may be replaced by a logic gate or a comparator.

It should likewise be obvious that any number of control circuits may be connected to common conductor 92 as long as a sufficient number of power supplies and current blocking means are provided.

While this invention has been described as having a preferred design, it is understood that it is capable of further modifications, uses and/or adaptations of the invention following in general the principle of the invention and including such departures from the present disclosure as some within known or customary practice in the art to which the invention pertains, and as may be applied to the central features hereinbefore set forth, and fall within the scope of the invention of the limits of the appended claims.

What I claim is:

1. A multi-purpose common conductor electrical system for use with a vehicle steering assembly or the like, comprising:
   (a) a steering assembly having a rotable steering wheel adapted for directing a vehicle;
   (b) first and second control circuits connected to said steering wheel and rotable therewith;
   (c) a common conductor connected to said first and said second control circuits and extending along at least a portion of the length of said steering assembly;
   (d) a power supply connected to said common conductor for providing power to said first and second control circuits;
   (e) blocking means for preventing the unintended conducting of power to said first control circuit when power is conducted to said second control circuit;
   (f) limiting means for intentionally diverting excess power to said first control circuit when power is conducted to said second control circuit for permitting simultaneous operation of said first and said second control circuit;
   (g) first intiation means mounted to said vehicle remote from said steering assembly and connected to said first control circuit through said common conductor for initiating operation of said first control circuit; and,
   (h) said second control circuit includes a second initiation means mounted generally to said steering wheel and an operator mounted to said vehicle remote from said steering assembly and connected to said second control circuit through said common conductor.

2. An electrical system as in claim 1, wherein:
   a. said first control circuit including an expandable air bag; and,
   b. said second control circuit including a signaling device.

3. An electrical system as in claim 2, further comprising:
   a. said steering assembly including a steering shaft connected to said steering wheel and rotatable therewith;
   b. electrical coupling means annularly mounted to said shaft and having a first portion secured to said shaft and rotatable therewith and a second portion sliding on said first portion;
   c. said common conductor having a first section and a second section;
   d. said first section connected to said first and said second control circuits and to one of said first and second portions of said coupling; and,
   e. said second section connected to the other one of said first and said second portions of said coupling means and to said power supply.

4. An electrical system as in claim 3, wherein:
   a. said electrical coupling means includes a single track slip ring.

5. An electrical system as in claim 4, further comprising:
   a. said power supply including a first voltage source and a second voltage source; and, b. said first voltage source having a pre-selected voltage and said pre-selected voltage being a pre-determined amount in excess of said second voltage source voltage.

6. An electrical system as in claim 5, wherein:
   a. said first voltage source having a voltage sufficient to operate said first control circuit; and,
   b. said second voltage source having a voltage sufficient to operate said second control circuit.

7. An electrical system as in claim 6, further comprising:
   a. a voltage regulator connected to said first voltage source and comprising said second voltage source.

8. An electrical system as in claim 7, wherein:
   a. said first voltage source voltage being substantially 12 volts; and,
   b. said second voltage source voltage being substantially 5 volts.

9. An electrical system as in claim 8, wherein:
   a. said blocking means including a diode capable of blocking a forward voltage of substantially 6.8 volts; and,
   b. said limiting means including a resistor of substantially 27 Ohm rating.

10. An electrical system as in claim 9, further comprising:
    a. a squib adapted for permitting expansion of said air bag ignitor; and,
    b. a relay controlled signaling device and including a horn.

11. An electrical system as in claim 10, wherein:
    (a) said first initiation means includes a remote sensor connected to said first control circuit for activating said squib.

12. An electrical system as in claim 11, wherein:
    (a) said operator includes a horn mounted to said vehicle remote of said steering assembly; and,
    (b) said second initiation means includes switch means connected to said steering wheel for activating said horn.

13. A circuit for operating a plurality of control circuits connected through a common conductor, comprising:
    (a) first and second power supplies, each of said power supplies having an associated voltage and said first voltage being in excess of said second voltage;
    (b) first and second control circuits connected to a common conductor;
    (c) first grounding means connected to said common conductor and to said first power supply for conducting current from said first power supply to said first and second control circuits;
    (d) second grounding means connected to said common conductor and to said second power supply for conducting current to said second control circuit;
    (e) current blocking means connected to said first control circuit and to said common conductor for permitting current flow from said first power supply to said first control circuit and for preventing current flow from said second power supply to said first control circuit whereby said second control circuit may be operated;
    (f) current limiting means connected to said second control circuit and to said common conductor for preventing grounding of said first power supply by said second grounding means whereby current flows from said first power supply to said first control circuit and said first control circuit may be simultaneously operated by said first grounding means; and,
    (g) said first grounding means connected to a first end portion of said common conductor and said second grounding means connected to generally a second end portion of said common conductor and said first end portion being spaced a distance from said second end portion.

14. A circuit as in claim 13, wherein:
    a. said first power supply includes a storage battery; and,
    b. said second power supply includes a voltage regulator connected to said battery.

15. A circuit as in claim 14, wherein:
    a. said first grounding means includes sensor switch means.

16. A circuit as in claim 15, wherein:
    a. said sensor switch means including a vehicle collision detector.

17. A circuit as in claim 16, wherein:
    a. said current blocking means includes a diode having a pre-selected breakdown voltage.

18. A circuit as in claim 17, wherein:
    a. said current limiting means including a resistor having a pre-selected resistivity level.

19. A circuit as in claim 18, wherein:
    a. said breakdonw voltage exceeding said second voltage.

20. A circuit as in claim 19, wherein:
    a. said first voltage being substantially 12 volts; and,
    b. said second voltage being substantially 5 volts.

21. A circuit as in claim 20, wherein:
    a. said breakdown voltage being substantially 6.8 volts; and,
    b. said resistivity being substantially 27 Ohms.

22. A circuit as in claim 19, wherein:
    a. said first control circuit including a squib adapted for causing inflation of an air bag; and,
    b. said second control circuit including a relay controlled signaling apparatus.

23. A circuit as in claim 22, wherein:
    a. said second grounding means including switch means adapted for operating said signaling means.

24. A circuit as in claim 23, wherein:
    a. said switch means connected to a horn for operating said horn.

25. A circuit as in claim 13, further comprising:
    a. said common conductor having a first section and a second section; and,
    b. coupling means electrically connecting said first section with said second section.

26. A circuit as in claim 25, wherein:
    a. said coupling means including a single track slip ring.

27. A circuit as in claim 14, further comprising:
    a. said second control circuit including an opto-coupler connected to said second power supply;
    b. a silicon controlled rectifier connected to said opto-coupler said first power supply and to a signaling device; and,
    c. said signaling device adapted for producing a commutation effect for shutting off the potential to said silicon controlled rectifier for turning off said signaling device.

28. An electrical system as in claim 5, further comprising:

a. said second control circuit including an opto-coupler connected to said second power supply;
b. a silicon controlled rectifier connected to said opto-coupler said first power supply and to a signaling device; and,
c. said signaling device producing a commutation effect for shutting off the potential to said silicon controlled rectifier for turning off said signaling device.

* * * * *